UNITED STATES PATENT OFFICE.

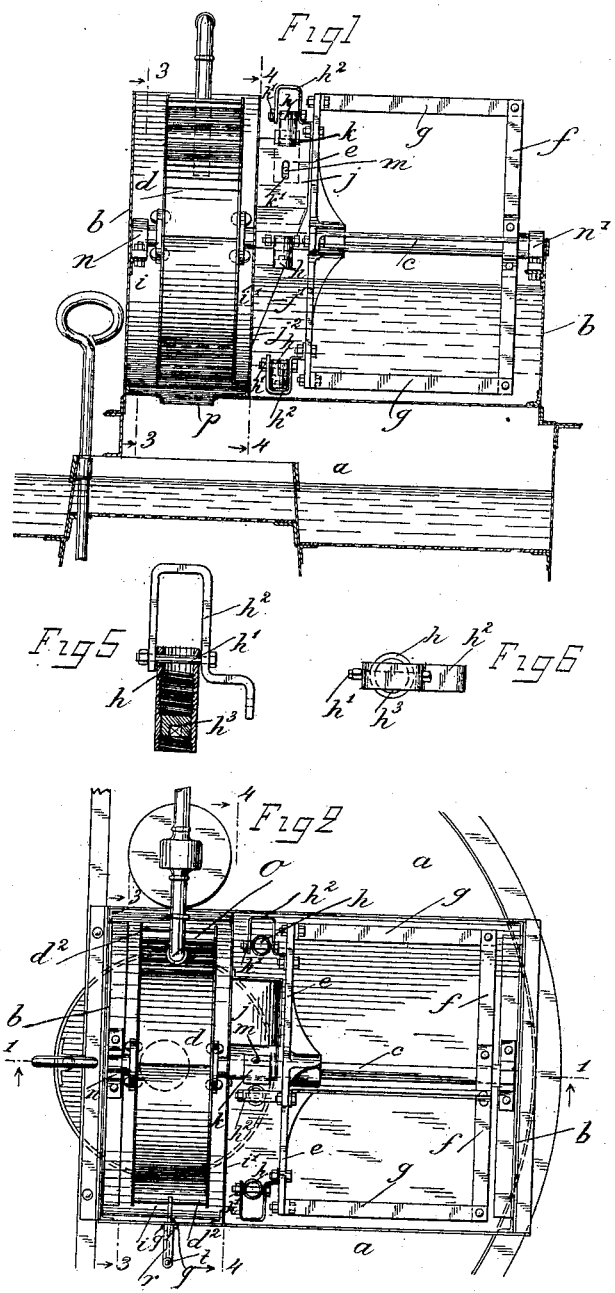

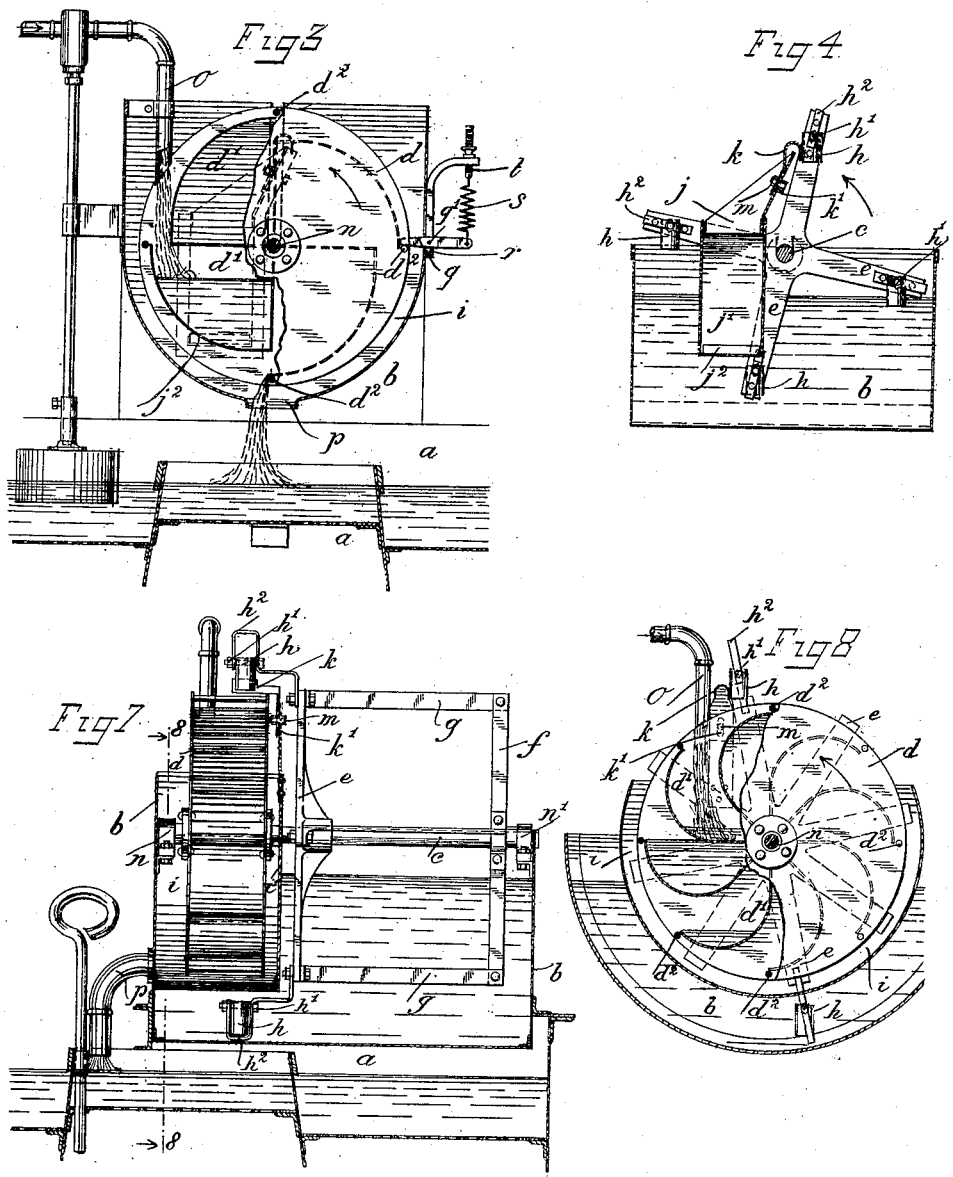

ADOLPHE LEWIS HELWIG, OF PARIS, FRANCE.

WATER-PURIFYING AND LIKE APPARATUS.

No. 902,401.  Specification of Letters Patent.  Patented Oct. 27, 1908.

Application filed August 23, 1907. Serial No. 389,863.

*To all whom it may concern:*

Be it known that I, ADOLPHE LEWIS HELWIG, a citizen of the United States, and a resident of Paris, France, whose post-office address is 1 Rue de Laborde, Paris, France, have invented a new and useful Improvement in Water-Purifying and Like Apparatus, for which I have obtained a patent in Belgium, No. 194,762, dated September 8, 1906; and I hereby declare the following specification, taken in connection with the accompanying drawings, to be a full, clear, and exact description of the same.

My invention relates to an improvement in a measuring apparatus for treating water by means of chemical products with the object of freeing it from the impurities which it contains in solution or in suspension.

The object of my invention is to automatically measure out and add to the water, in a simple and efficient manner, and in proportion to the quantity of the water and its degree of impurity, the chemical substances with which it is to be treated.

In the annexed drawings which show by way of example a practical form of the apparatus according to this invention, Figure 1 is an elevation of the apparatus in vertical longitudinal section on the line 1—1 of Fig. 2, as arranged over a filter or settling tank of any appropriate construction. Fig. 2 is a plan view of Fig. 1. Fig. 3 is a vertical section on the line 3—3 of Figs. 1 and 2, a portion of the casing being broken away to show the internal construction. Fig. 4 is a vertical section on the line 4—4 of Figs. 1 and 2. Fig. 5 is a detail showing partly in section on an enlarged scale a convenient construction of one of the cups of variable capacity, for measuring and distributing the chemicals. Fig. 6 is a plan view of Fig. 5. Fig. 7 is a view of a modified form. Fig. 8 is a section on the line 8—8 of Fig. 7 and looking in the direction of the arrows.

In the drawings $a$ designates a filter or settling tank of any appropriate construction. Arranged above this settling tank is the measuring and distributing apparatus comprising essentially a vessel $b$, of any shape and dimension, and adapted to contain the chemical products which are to be added to the water. This vessel can be connected or be in communication with another vessel or reservoir, (not shown) in which the chemicals are mixed. In the drawings, the vessel $b$ is shown square; this form however, may be varied at will, and may be of semi-cylindrical shape as shown in Fig. 8, rectangular, or of any other contour.

In the two end walls of the vessel $b$, is journaled a shaft $c$, to which is keyed or otherwise secured a water wheel or drum $d$, having troughs or buckets, and a stirring device constituted by two cross frames $e, f$, connected by rods or stirrers $g$ see Figs. 1 and 2. To the arms of one of the cross frames $e$, are attached, so as to be suspended therefrom, cups $h$, the construction and object of which will presently appear.

The drum $d$, provided with any desired number of compartments or buckets $d^1$, as shown in Fig. 3 is arranged in a chamber $i$, separated from the vessel $b$, by a partition $i^1$. To one side of this partition is secured a chute $j$, see Figs. 1, 2, 3 and 4, the lower part $j^1$ of which is tapered, see Fig. 1. This chute communicates at its lower end through an opening $j^2$, see Figs. 1, 3 and 4, in the partition $i^1$, with the chamber $i$, containing the drum $d$.

The cups $h$, are attached to the arms $e$, or suspended therefrom, so as to, at all times, maintain a vertical position and to plunge successively in the solution contained in the vessel $b$, as the cross frame $e$ is rotated together with the shaft $c$.

In the construction shown by way of example in the annexed drawings, these cups are arranged to freely turn about the axles $h^1$, from which they are suspended at points above their center of gravity, within straps $h^2$, attached to the arms $e$, in any convenient manner. Each cup consists preferably as shown in Figs. 5 and 6, of a cylindrical body, having its internal surfaces partially screw threaded, so as to receive the screw threaded bottom or stopper $h^3$ which on being screwed up or down, diminishes or augments as can easily be understood, the capacity of the cup $h$, and consequently the quantity of the chemicals scooped up by each cup, on its way through the vessel $b$.

The upper portion of the chute $j$, carries an adjustable abutment, of any appropriate shape, and consisting, as shown for example in Fig. 4 of the drawings, of a hooped member or tappet $k$, the lower portion $k^1$ of which is slotted and adapted to be secured by a screw $m$ or the like, see Figs. 1, 2, 4, 7 and 8, and adjustable at will, along the wall of the chute $j$, so as to project to any desired extent into the path of the cups $h$, carried along by the arms $e$, during rotation.

The bearings $n$, $n^1$ which support the shaft $c$, in the walls of the vessel $b$, are preferably open and the partition $i^1$ has, for the passage of the shaft $c$, an opening or slot so arranged that the said shaft, together with the parts which it carries, namely the drum $d$, cups $h$, and the stirring device $e$, $f$, $g$, may be easily with-drawn from the vessel $b$, and from the compartment $i$.

Arranged on the drum $d$, are stops $d^2$, Fig. 3, into the path of which extends one of the ends of a lever $q$, pivoted at $q^1$ to a bracket $r$ secured to or forming part of the vessel $b$. The other end of the lever $q$ is subjected to the influence of a spring $s$, tending to draw the free end of the lever $q$, into the path of the stops $d^2$, and adjustable by means of a screw $t$, or in any other convenient manner.

The operation of the apparatus is as follows. The water to be treated is introduced through a pipe or conduit, $o$, as shown in Fig. 3, into that compartment or bucket $d^1$, of the drum $d$, which at that moment happens to be opposite the opening of said conduit $o$. As this bucket $d^1$ is gradually filled the weight of the water contained therein forces the drum $d$, and shaft $c$, to rotate until one of the stops $d^2$ is caused to strike against the lever $q$. The drum $d$, is thereby arrested until a sufficient quantity of water is contained in the compartment $d^1$ so as to over-come the resistance of the spring $s$, and to rock the lever $q$, against the action of said spring. This being done the drum and shaft continue to rotate and on carrying with them the cups $h$, that cup which encounters the tappet $k$, is caused to be tilted upon striking the tappet $k$, and to discharge its contents into the chute $j$, which in turn discharges the reagents carried by said bucket through the opening $j^2$, into the chamber $i$, where they mix with the water discharged from the drum $d$, and pass through the port or outlet $p$, into the settling tank $a$. The drum $d$, in rotating, causes the cups $h$, to descend successively into the solution of chemicals contained in the vessel $b$, and to scoop up the latter, on their way to the tappet $k$, where they are emptied again into the chute $j$, as described. At the same time the stirrers $g$, traverse the solution contained in the vessel $b$, thus raking up or stirring the chemicals of which it is composed, and which are thus constantly and intermittently mixed with each other.

It will be understood that according to the proportion of chemicals desired to be added to the impure water, the capacity of the measuring cups $h$, with regard to that of the buckets $d^1$ of the drum $d$, may be varied at will by adjusting the movable bottoms $h^3$, of the cups. Likewise, in adjusting if desired, the position of the tappet $k$, the extent of tilting of the cups $h$, can be so controlled as to add to the water according to the volume of each bucket $d^1$, precisely the desired quantity of the re-agent.

In the modification shown in Figs. 7 and 8 I have shown the cup $h$ arranged on the extreme end of the stirring device, so as to rotate concentrically about the circumference of the drum $d$ and of the chamber $i$, and to discharge their contents directly into the compartment $i$ or into the buckets $d'$ of the drum $d$. This is accomplished by the cups $h$ coming into contact with an abutment $k'$ similar to $k$.

It will thus be seen that my device constitutes a measuring apparatus for the purifying of water, and provides a means whereby the water to be purified is first measured in the compartments $d^1$, the filling of which is compelled by the controlling lever $q$; it also provides in the adjustable cups $h$ a means for measuring quantities of chemicals, proportional to the amounts of water delivered in the compartments $d^1$. And that the operation of the cups $h$ is rendered more certain by the adjustable stop or tappet $k$ located on the chute $j$, into which said cups discharge.

I do not limit myself to the details of construction as described and illustrated, since the latter may be varied without departing from the spirit of my invention.

I claim:

1. In a measuring device for a water purifying apparatus, the combination of a rotating wheel provided with a rotary shaft and a plurality of measuring compartments; a water supply for filling said compartments as the wheel rotates; a tank into which said compartments discharge; stops $d^2$ on said wheel; a pivoted lever projecting in the path of said stops to control the movement of said wheel; means to control said lever; adjustable measuring cups means for pivotally mounting said cups on said shaft so they may revolve therewith and said cups adapted to hold predetermined quantities of chemicals; a chute having an inclined bottom into which said cups are adapted to discharge, and itself discharging into said tank; and an adjustable stop on said chute adapted to tip said cups as they revolve, whereby said compartments may discharge definite quantities of water, and said cups proportional quantities of chemicals into said tank, substantially as described.

2. In a measuring device for a water purifying apparatus, the combination of a rotating wheel provided with a rotary shaft and a plurality of compartments; a water supply for filling said compartments as the wheel rotates; a tank below said wheel into which said compartments discharge; stops on said wheel; a pivoted lever projecting in the path of said stops to control the movement of said wheel; a spring for controlling said lever; a screw for controlling the tension of said spring; adjustable measuring cups means for pivotally mounting said cups on said shaft so they may revolve therewith and said cups adapted to hold predetermined quantities of chemicals; a chute having an inclined bottom into which said cups are adapted to discharge, and itself discharging into said tank; and an adjustable stop on said chute adapted to tip said cups as they revolve, whereby said compartments may discharge definite quantities of water, and said cups proportional quantities of chemicals into said tank, substantially as described.

3. In a measuring device for a water purifying apparatus, the combination of a rotating wheel provided with a rotary shaft and a plurality of compartments; a water supply for filling said compartments as the wheel rotates; a tank below said wheel into which said compartments discharge; stops on said wheel; a pivoted lever projecting in the path of said stops to control the movement of said wheel; a spring for controlling said lever; a screw for controlling the tension of said spring; measuring cups scew threaded on their interior and provided with the screw threaded adjustable bottoms $h^3$ means for pivotally mounting said cups on said shaft, so they may revolve therewith and said cups adapted to hold predetermined quantities of chemicals; a chute having an inclined bottom into which said cups are adapted to discharge, and itself discharging into said tank; and an adjustable stop on said chute adapted to tip said cups as they revolve, whereby said compartments may discharge definite quantities of water, and said cups proportional quantities of chemicals into said tank, substantially as described.

4. In a measuring device for a water purifying apparatus, the combination of a rotating wheel provided with a rotary shaft and a plurality of compartments; a water supply for filling said compartments as the wheel rotates; a tank below said wheel into which said compartments discharge; stops on said wheel; a pivoted lever projecting in the path of said stops to control the movement of said wheel; a spring for controlling said lever; a screw for controlling the tension of said spring; a receptacle to hold chemicals; a stirrer mounted on said shaft adapted to rotate therewith and enter said receptacle; a plurality of measuring cups pivotally mounted on said stirrer and adapted to dip up predetermined quantities of chemicals as said shaft rotates; a chute having an inclined bottom into which said cups are adapted to discharge, and itself discharging into said tank; and an adjustable stop on said chute adapted to tip said cups as they revolve, whereby said compartments may discharge definite quantities of water, and said cups proportional quantities of chemicals into said tank, substantially as described.

5. In a measuring device for a water purifying apparatus, the combination of a rotating wheel provided with a rotary shaft and a plurality of compartments; a water supply for filling said compartments as the wheel rotates; a tank below said wheel into which said compartments discharge; stops on said wheel; a pivoted lever projecting in the path of said stops to control the movement of said wheel; a spring for controlling said lever; a screw for controlling the tension of said spring; a receptacle to hold chemicals; a stirrer mounted on said shaft adapted to rotate therewith and enter said receptacle; a plurality of measuring cups each pivotally mounted on said stirrer, provided with screw threads on their interiors and having screw threaded adjustable bottoms, and each adapted to dip up predetermined quantities of chemicals bearing a fixed ratio to the quantities of water in said compartments as said shaft rotates; a chute having an inclined bottom into which said cups are adapted to discharge, and itself discharging into said tank; and an adjustable stop on said chute adapted to tip said cups as they revolve, whereby said compartments may discharge definite quantities of water, and said cups proportional quantities of chemicals into said tank, substantially as described.

ADOLPHE LEWIS HELWIG.

Witnesses:
FRANK W. HAY,
DEAN B. MASON.